US006951617B2

(12) United States Patent
Fries et al.

(10) Patent No.: US 6,951,617 B2
(45) Date of Patent: Oct. 4, 2005

(54) METHOD AND APPARATUS FOR CONTROLLING FLOW PROFILE TO MATCH LAMP FLUENCE PROFILE

(75) Inventors: William M. Fries, San Diego, CA (US); John S. Thompson, San Clemente, CA (US); Benjamin H. Holko, San Diego, CA (US); Kenton J. Salisbury, San Diego, CA (US)

(73) Assignee: PurePise Technologies, Inc., San Diego, CA (US)

( * ) Notice: Subject to any disclaimer, the term of this patent is extended or adjusted under 35 U.S.C. 154(b) by 51 days.

(21) Appl. No.: 10/664,249

(22) Filed: Sep. 16, 2003

(65) Prior Publication Data

US 2005/0056597 A1 Mar. 17, 2005

(51) Int. Cl.[7] .................................................. C02F 1/32
(52) U.S. Cl. ...................... 210/748; 422/24; 422/186.3; 250/438
(58) Field of Search ............................... 210/748, 198.1, 210/205; 422/24, 186.3; 96/224; 250/432 R, 435, 437, 438

(56) References Cited

U.S. PATENT DOCUMENTS

| 3,572,391 | A |   | 3/1971  | Hirsch |
|-----------|---|---|---------|--------|
| 4,184,076 | A |   | 1/1980  | Kosnoff |
| 4,270,577 | A |   | 6/1981  | Brown et al. |
| 4,280,360 | A |   | 7/1981  | Kobayashi et al. |
| 4,660,587 | A |   | 4/1987  | Rizzie |
| 4,769,131 | A | * | 9/1988  | Noll et al. ..................... 210/85 |
| 4,825,083 | A | * | 4/1989  | Latel et al. ................. 250/436 |
| 4,871,559 | A |   | 10/1989 | Dunn et al. |
| 4,910,942 | A |   | 3/1990  | Dunn et al. |
| 5,034,235 | A |   | 7/1991  | Dunn et al. |
| 5,120,450 | A | * | 6/1992  | Stanley, Jr. ................. 210/748 |
| 5,227,637 | A |   | 7/1993  | Herold et al. |
| 5,255,205 | A |   | 10/1993 | Wurm et al. |
| 5,255,716 | A |   | 10/1993 | Wilcox |
| 5,341,848 | A |   | 8/1994  | Laws |
| 5,392,815 | A |   | 2/1995  | Stuart |
| 5,495,872 | A |   | 3/1996  | Gallagher et al. |
| 5,529,093 | A |   | 6/1996  | Gallagher et al. |
| 5,596,152 | A |   | 1/1997  | Bergervoet et al. |
| 5,762,107 | A |   | 6/1998  | Laws |
| 5,768,853 | A |   | 6/1998  | Bushnell et al. |
| 5,786,598 | A |   | 7/1998  | Clark et al. |
| 5,819,803 | A |   | 10/1998 | Lebo et al. |
| 5,900,211 | A | * | 5/1999  | Dunn et al. .................... 422/24 |
| 5,925,257 | A | * | 7/1999  | Albelda et al. ............. 210/748 |
| 6,186,179 | B1 |  | 2/2001  | Hill |
| 6,224,759 | B1 | * | 5/2001  | Whitby et al. ........... 210/198.1 |
| 6,312,593 | B1 | * | 11/2001 | Petrie ......................... 210/205 |
| 6,420,715 | B1 | * | 7/2002  | Cormack et al. ........... 250/438 |
| 6,501,079 | B1 | * | 12/2002 | Furuya ....................... 250/437 |
| 2003/0205454 | A1 | * | 11/2003 | Hlavinka et al. ...... 204/157.15 |

FOREIGN PATENT DOCUMENTS

WO    WO 95/08064    3/1995

* cited by examiner

Primary Examiner—Frank M. Lawrence
(74) Attorney, Agent, or Firm—Thomas F. Lebens; Fitch, Even, Tabin & Flannery

(57) ABSTRACT

A system for treating a fluid comprising a treatment chamber; a light source for emitting light, such that at least a portion of the light travels within the treatment chamber; and a treatment area within the treatment chamber; wherein a flow profile of the fluid in the treatment area matches the fluence profile of the light that travels within the treatment area. An apparatus for providing a substantially uniform light treatment of a flowing fluid by providing a light source or sources and establishing (or controlling) the flow such that the combination of light intensity and flow velocity provides substantially uniform treatment (i.e. the faster moving fluid streams are treated at higher intensity and the slower moving fluid streams are treated at lower intensity).

26 Claims, 6 Drawing Sheets

METHOD AND APPARATUS FOR CONTROLLING FLOW PROFILE TO MATCH LAMP FLUENCE PROFILE

BACKGROUND OF INVENTION

1. Field of the Invention

The present invention relates generally to treatment of fluids. More specifically, but without limitation thereto, the present invention relates matching the flow velocity of a fluid to the fluence pattern of a treatment lamp.

2. Discussion of the Background Art

The treatment of fluid using light is well known in the art. One of the problems associated with the treatment of fluid using light is making sure the fluid is properly treated. All of the fluid must receive a minimal amount of energy or the treatment can be inadequate. One solution to this problem is to treat the fluid with a very high dose of light, thus ensuring each particle of the fluid receives enough energy. This solution is very inefficient, as much of the fluid being treated will receive much more energy than is necessary.

Additionally, over treatment of fluids may lead to the fluid being damaged or destroyed for its intended purpose. Thus, in some environments treating the fluid with a very high dose of light to ensure every particle receives enough is not possible as some of the particles may be damaged or destroyed. Thus, systems have been developed where a very thin layer of fluid is treated so as to ensure all of the fluid receives approximately the same amount of energy. This is also very inefficient as treating large amount of fluid takes a very long time. This is because the volume of fluid that can flow though a thin layer is greatly reduced as compared to a fluid flowing though a circular pipe or tubing.

Thus there is a need for an apparatus for treating fluids which can solve the problems discussed above.

SUMMARY OF INVENTION

The present invention advantageously addresses the need above as well as other needs by providing a flow control system for controlling the fluid while being exposed to a light source. In one embodiment, the present invention provides a flow control system for matching the fluid flow profile with a lamp fluence profile.

In one embodiment the present invention is a system for treating a fluid comprising a treatment chamber; a light source for emitting light, such that at least a portion of the light travels within the treatment chamber; and a treatment area within the treatment chamber; wherein a flow profile of the fluid in the treatment area approximately matches the fluence profile of the light that travels within the treatment area.

In another embodiment the invention can be characterized as a system for the treatment of fluid comprising a treatment chamber; a light source for emitting light, such that at least a portion of the light travels within the treatment chamber; and a plurality of transmissive baffles for controlling the flow of fluid within the treatment chamber; wherein the transmissive baffles allow transmission of the light throughout the treatment chamber preventing biofilm buildup within the treatment chamber.

In yet another embodiment the invention advantageously includes an apparatus for treating a liquid with light comprising a treatment chamber; a first baffle within the treatment chamber for slowing the velocity of the fluid; a second baffle within the treatment chamber for matching the flow of the fluid a fluence profile of light traveling within at least a portion of the treatment chamber; and a third baffle within the treatment chamber for maintaining the flow of the fluid throughout a treatment area.

In an alternative embodiment the invention includes a method of treating a fluid comprising inputting the fluid into a treatment chamber; exposing the fluid to light from the treatment lamp; matching an established flow profile of the fluid with a fluence pattern of a light source within at least a portion of the treatment chamber; and outputting the fluid from the treatment chamber.

In another embodiment the invention includes a method of treating fluid comprising inputting a fluid into a treatment chamber; matching a flow profile of the fluid with a fluence pattern of a treatment lamp; and outputting the fluid from the treatment chamber.

BRIEF DESCRIPTION OF DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

When treating a fluid with light it is preferred that every particle of fluid receive the same amount of energy. Additionally, the cost of the treatment can be minimized by only treating the fluid with an optimal amount of energy. One way in which this can be done is to match the light fluence profile with the fluid flow profile. This maximizes the use of the fluence pattern, thus saving energy in the treatment process.

Figure 1A:
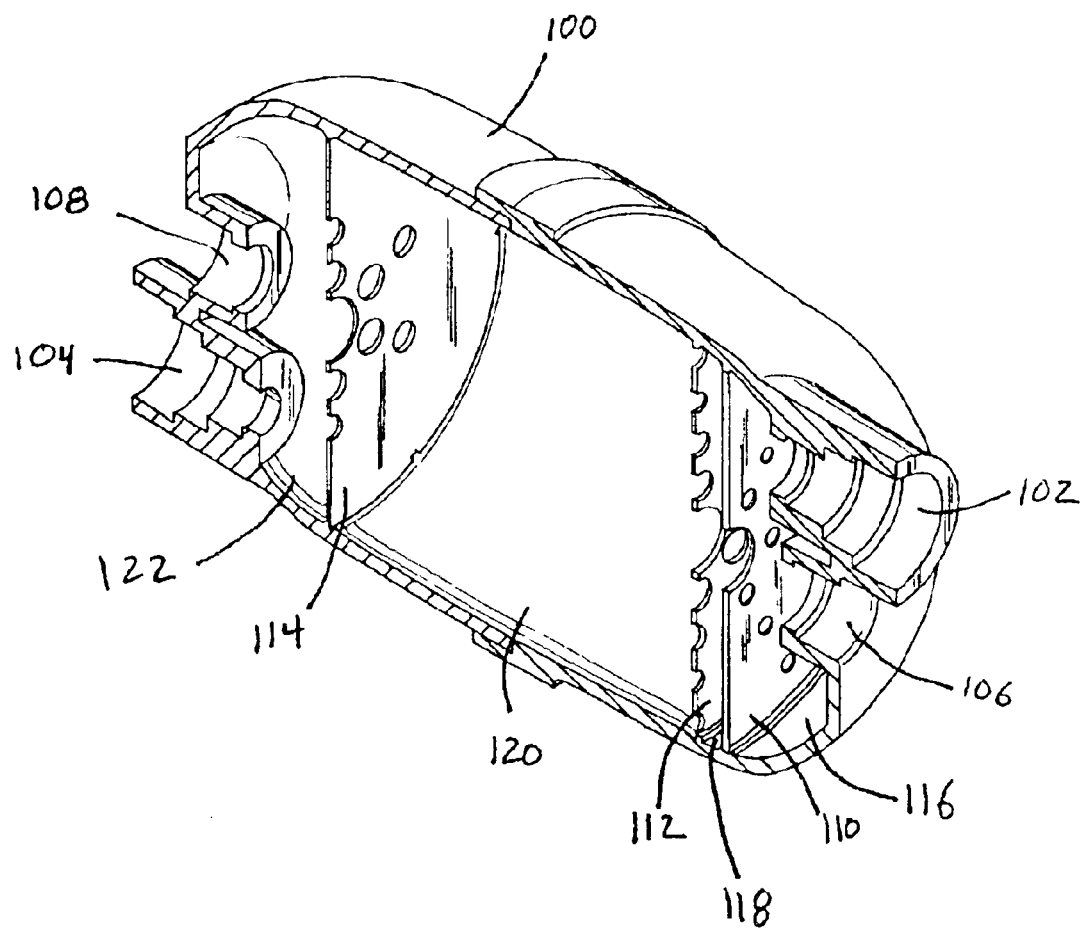
FIG. 1A illustrates an isometric cross-sectional view of a treatment chamber in accordance with the present invention.

Referring to FIG. 1A a three dimensional cross-sectional view of a treatment chamber of the present invention is shown. Shown is the treatment chamber 100, an inlet 102, an outlet 104, a first lamp holder 106, a second lamp holder 108, a first inlet baffle 110, a second inlet baffle 112, an outlet baffle 114, a first input area 116, a second input area 118, a treatment area 120, and an output area 122.

In the embodiment shown in FIG. 1A the inlet 102 is positioned at the opposite end of the treatment chamber 100 as the outlet. The inlet 102 leads into the first input area 116 of the treatment chamber 100. The first inlet baffle 110 separates the first input area 116 from the second input area 118. The second inlet baffle 112 separates the second input area 118 from the treatment area 120. The outlet baffle 114 separates the treatment area 120 from the output area 122. The output area 122 leads into the outlet 104 of the treatment chamber 100. The first inlet baffle 110, the second inlet baffle 112 and the outlet baffle 114 are all coupled to an inside of the treatment chamber 100.

The first input area 116 is between the inlet 102 and the first inlet baffle 110. The second input area 118 is between the first inlet baffle 110 and the second inlet baffle 112. The treatment area 120 is between the second inlet baffle 112 and the outlet baffle 114. The output area 122 is between the outlet baffle 114 and the outlet 104.

In the embodiment shown in FIG. 1A the fluid is exposed to light in the treatment area 120. In another embodiment the fluid can be treated with light throughout the treatment chamber 100. In a subsequent embodiment the fluid could be exposed to light in only a portion of the treatment area 120. It should be understood from the examples given that the fluid could be exposed to light in any portion of the treatment chamber 100 including but not limited to a portion of the treatment area 120. In one embodiment the length of the treatment area 120 is 60 mm.

In one embodiment a fluid, e.g., water, flows through the treatment chamber 100. The fluid enters the treatment chamber 100 through the inlet 102, moves through the first input area 116, the second input area 118, the treatment area 120, the output area 122 and exists through the outlet 104. As the fluid flows through the treatment chamber 100 it comes in contact with the first inlet baffle 110, the second inlet baffle 112 and the outlet baffle 114.

In one embodiment of the present invention, the first inlet baffle 110, the second inlet baffle 112 and the outlet baffle 114 are used in combination to create (circumferentially uniform but progressively axially slower flow away from the lamp) non-uniform flow velocity which is designed to match a fluence profile of a treatment lamp. The first inlet baffle 110, shown in FIG. 2, slows the inlet velocity of the fluid down and scatters the flow to evenly distribute it throughout the treatment chamber 100. The second inlet baffle 112, shown in FIG. 3, distributes the flow through the treatment chamber 100 in such a way that the flow matches the fluence profile of the treatment lamp. The outlet baffle 114, shown in FIG. 4, directs the fluid toward the middle of the treatment chamber 100 so that the fluid maintains the desired flow velocity over the treatment area 120.

It should be understood that shape of the treatment chamber 100 can be changed, e.g., the length, radius and shape of the treatment chamber 100 can be changed without deviating from the scope of the present invention. For example, the treatment chambers shown in FIGS. 1A and 6 can be used to establish a non-uniform flow with the fluid nearer the middle of the treatment chambers moving either faster or slower than the fluid near the outside of the treatment chambers. In accordance with the present invention, this provides for a treatment chamber wherein a light source (e.g., a treatment lamp or plurality of treatment lamps) is either inside or outside of the treatment chamber.

Figure 1B:
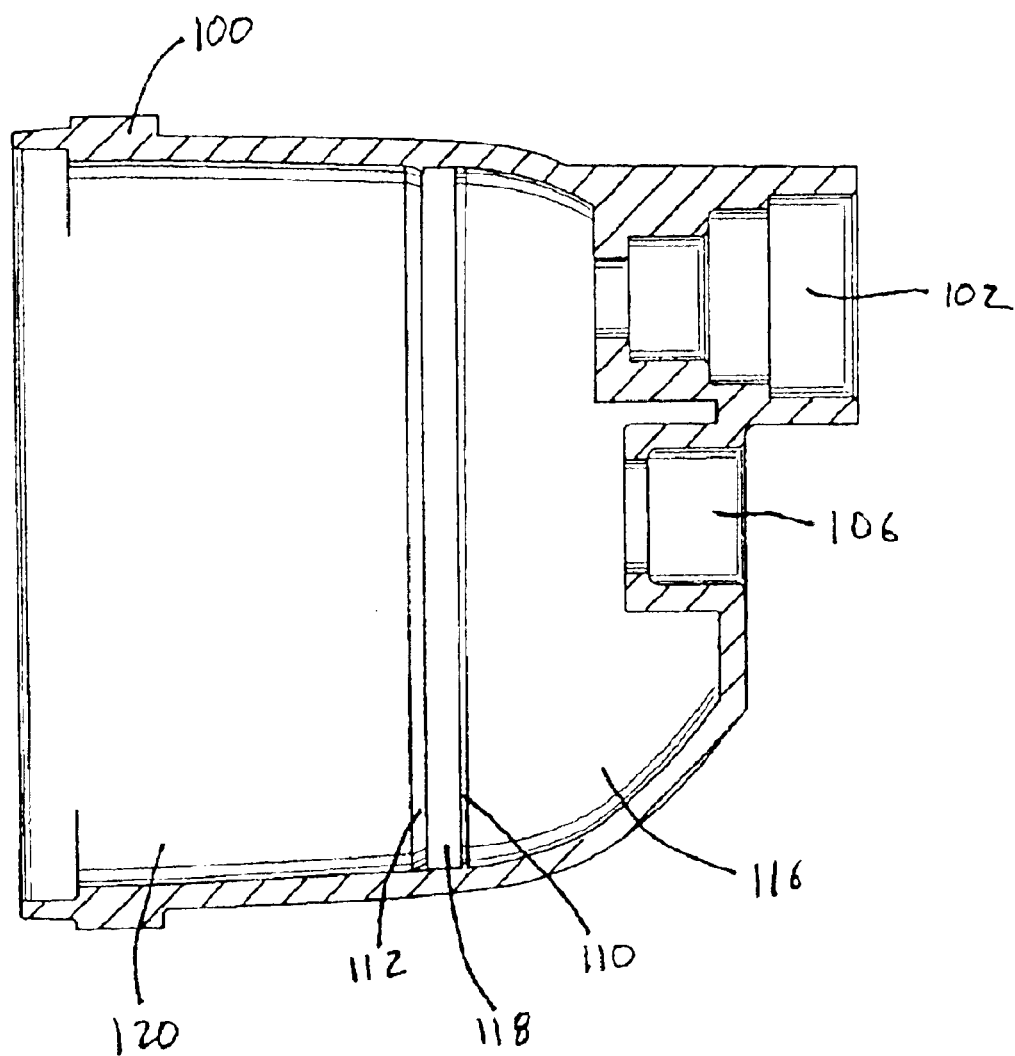
FIG. 1B illustrates a partial cross sectional view of the treatment chamber shown in FIG. 1A.

Referring to FIG. 1B a partial cross sectional view of the treatment chamber of FIG. 1A is shown. Shown is the treatment chamber 100, the inlet 102, the first lamp holder 106, the first inlet baffle 110, the second inlet baffle 112, the first input area 116, the second input area 118, and the treatment area 120.

Figure 2:
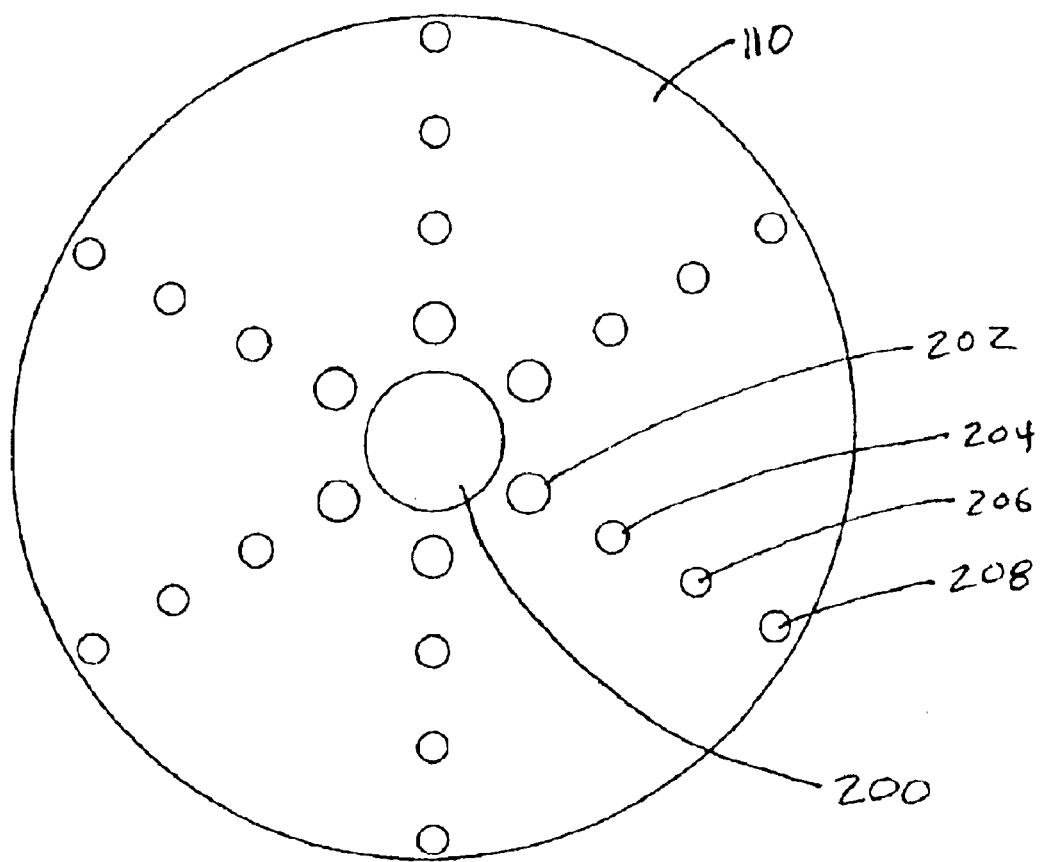
FIG. 2 illustrates a first inlet baffle designed for establishing a non-uniform flow of fluid through the treatment chamber of FIG. 1A.

Referring to FIG. 2 the first inlet baffle designed is shown for establishing non-uniform flow through the treatment chamber. Shown is the first inlet baffle 110, a center hole 200, a first plurality of holes 202, a second plurality of holes 204, a third plurality of holes 206 and a fourth plurality of holes 208.

In the embodiment shown the first inlet baffle 110 is circular in shape. The center hole 200 is cut away such that a treatment lamp can be place through it. The first inlet baffle 110 has a radius substantially the same as a radius of the inside of the treatment chamber 100. In one preferred embodiment the radius of the first inlet baffle 110 is 27.34 mm. It should be understood that the radius of the first inlet baffle 110 can be adjusted as the size of the treatment chamber 100 changes.

The first plurality of holes 202 are centered around a first radius from the center of the first inlet baffle 110. The second plurality of holes 204 are centered around a second radius from the center of the first inlet baffle 110. The third plurality of holes 206 are centered around a third radius from the center of the first inlet baffle 110. The fourth plurality of holes 208 are centered around a fourth radius from the center of the first inlet baffle 110. The first plurality of holes 202 are evenly spaced around the first inlet baffle 110. In the embodiment shown the first plurality of holes 202 are each spaced 60 degrees apart from one another. The second plurality of holes 204, the third plurality of holes 206 and the fourth plurality of holes 208 are additionally spaced 60 degrees apart from each other. In a preferred embodiment the first radius is 7.65 mm, the second radius is 13.75 mm, the third radius is 19.85 mm and the fourth radius is 25.95 mm. It should be understood the holes can be placed at different distances from the center of the first inlet baffle 110 without deviating from the scope of the present invention. It should also be understood that the holes can be spaced at different degrees apart depending on how many holes are being used. For example, if the first plurality of holes 202 include only four holes, the holes will be spaced 90 degrees apart. Additionally, it is not necessary that the holes all be spaced evenly apart or on the same angular placement at the different radii. The hole geometry and spacing from the axis creates a specific proportional mass flow rate at that given axis from the lamp. The baffling for each area was then adjusted to achieve a proportional mass flow rate matching the fluence of the lamp. Baffles can be holes, sintered materials, concentric vanes, or other pressure control mechanisms to achieve the effect of controlled velocity.

The treatment lamp, not shown, fits through the center hole 200. The fluid travels through the first plurality of holes 202, the second plurality of holes 204, the third plurality of holes 206 and the fourth plurality of holes 208. In a preferred embodiment the first plurality of holes 202 have a diameter of 2.62 mm, the second plurality of holes 204 have a diameter of 2.09 mm, the third plurality of holes 206 have a diameter of 1.93 mm and the fourth plurality of holes 208 have a diameter of 1.84 mm. The center hole 200 has a diameter of 9.2 mm. It should be understood the diameter of all of the holes could be changed without deviating from the scope of the present invention. Additionally, it is not necessary that the holes are circular, e.g., the holes could be a variety of other shapes.

The first inlet baffle 110 is designed to slow the inlet velocity of the fluid down and redirect fluid momentum. The first baffle changes the fluid inertia to redirect mass flow more evenly to the second input area 118 of the treatment chamber 100.

Figure 3:
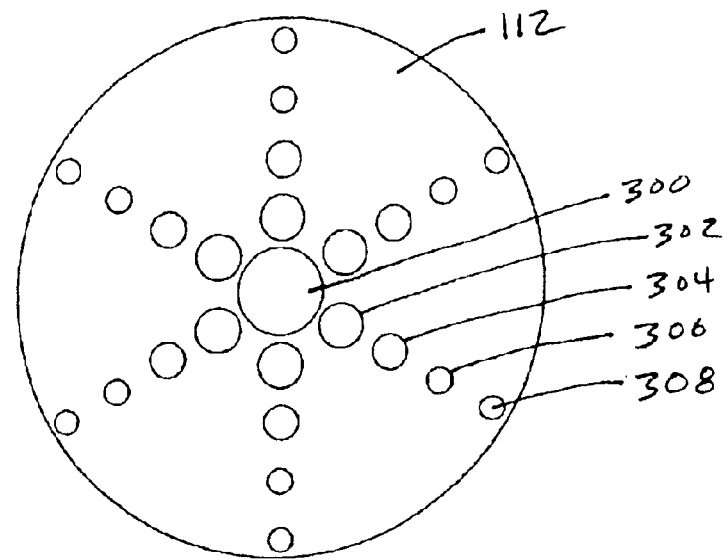
FIG. 3 illustrates a second inlet baffle designed for establishing a non-uniform flow of fluid through the treatment chamber of FIG. 1A.

Referring to FIG. 3 the second inlet baffle 112 is shown designed for establishing non-uniform flow through the treatment chamber 100. Shown is the second inlet baffle 112, a center hole 300, a first plurality of holes 302, a second plurality of holes 304, a third plurality of holes 306 and a fourth plurality of holes 308.

In the embodiment shown the second inlet baffle 112 is circular in shape. The center hole 300 is cut away such that the treatment lamp can be place through it. The second inlet baffle 112 has a radius substantially the same as a radius of the inside of the treatment chamber 100. In one preferred embodiment the radius of the second inlet baffle 112 is 27.90 mm. It should be understood that the radius of the second inlet baffle 112 can be adjusted as the size of the treatment chamber 100 changes.

The first plurality of holes 302 are centered around a first radius from the center of the second inlet baffle 112. The second plurality of holes 304 are centered around a second radius from the center of the second inlet baffle 112. The third plurality of holes 306 are centered around a third radius from the center of the second inlet baffle 112. The fourth plurality of holes 308 are centered around a fourth radius from the center of the second inlet baffle 112. The first plurality of holes 302 are evenly spaced around the second inlet baffle 112. In the embodiment shown the first plurality of holes 302 are each spaced 60 degrees apart from one another. The second plurality of holes 304, the third plurality of holes 306 and the fourth plurality of holes 308 are additionally spaced 60 degrees apart from each other. In a preferred embodiment the first radius is 7.65 mm, the second radius is 13.75 mm, the third radius is 19.85 mm and the fourth radius is 25.95 mm. It should be understood the holes can be placed at different distances from the center of the second inlet baffle without deviating from the scope of the present invention. It should also be understood that the holes can be spaced at different degrees apart depending on how many holes are being used. For example, if the first plurality of holes 302 included only four holes, the holes would be spaced 90 degrees apart. Additionally, it is not necessary that the holes all be spaced evenly apart. The main operating principles are the $1^{st}$ baffles purpose is to eliminate fluid inertia from a non concentric entry port. The second baffle redirects the fluid inertia to provide even mass flow output circumferentially.

The treatment lamp, not shown, fits through the center hole 300. The fluid travels through the first plurality of holes 302, the second plurality of holes 304, the third plurality of holes 306 and the fourth plurality of holes 308. In a preferred embodiment the first plurality of holes 302 have a diameter of 4.67 mm, the second plurality of holes 304 have a diameter of 3.72 mm, the third plurality of holes 306 have a diameter of 2.58 mm and the fourth plurality of holes 308 have a diameter of 2.45 mm. The center hole 300 has a diameter of 9.2 mm. It should be understood the diameter of all of the holes could be changed without deviating from the scope of the present invention. Additionally, it is not necessary that the holes are circular, e.g., the holes could be a variety of other shapes.

The second inlet baffle 112 is designed to distribute the flow of the fluid in such a way that it matches the fluence profile of the treatment lamp as the fluid moves through the treatment area 120. This will be further described with reference to FIG. 5.

Figure 4:
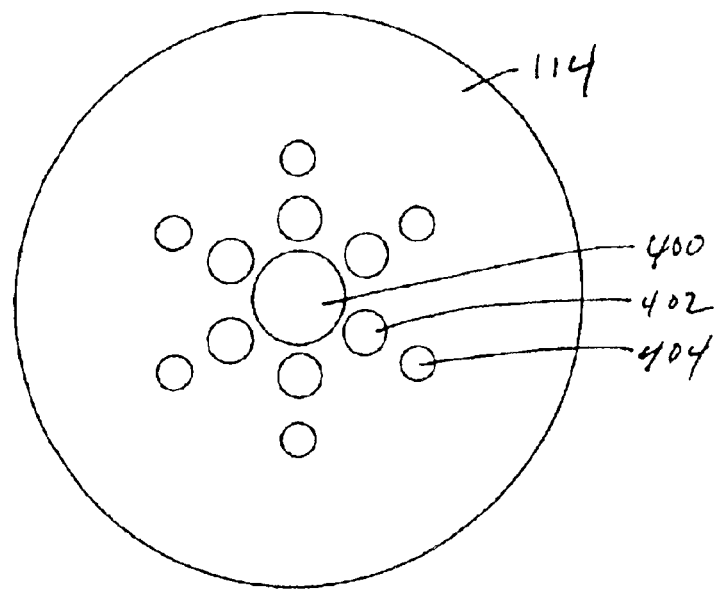
FIG. 4 illustrates an outlet baffle designed for establishing a non-uniform flow of fluid through the treatment chamber of FIG. 1A.

Referring to FIG. 4 the outlet baffle 114 is shown designed for establishing non-uniform flow through the treatment chamber 100. Shown is the outlet baffle 114, a center hole 400, a first plurality of holes 402 and a second plurality of holes 404.

In the embodiment shown the outlet baffle 114 is circular in shape. The center hole 400 is cut away such that the treatment lamp can be place through it. The outlet baffle 114 has a radius substantially the same as a radius of the inside of the treatment chamber 100. In one preferred embodiment the radius of the outlet baffle 114 is 27.90 mm. It should be understood that the radius of the outlet baffle 114 can be adjusted as size of the treatment chamber 100 changes.

The first plurality of holes 402 are centered around a first radius from the center of the outlet baffle 114. The second plurality of holes 404 are centered around a second radius from the center of the outlet baffle 114. The first plurality of holes 402 and the second plurality of holes 404 are evenly spaced around the outlet baffle 114. In the embodiment shown first plurality of holes 402 and the second plurality of holes 404 are each spaced 60 degrees apart from one another. In a preferred embodiment the first radius is 7.65 mm and the second radius is 13.75 mm. It should be understood the holes can be placed at different distances from the center of the outlet baffle 114 without deviating from the scope of the present invention. It should also be understood that first plurality of holes 402 and the second plurality of holes 404 can be spaced at different degrees apart depending on how many holes are being used. For example, the first plurality of holes can included four holes such that the four holes are spaced 90 degrees apart. Additionally, it is not necessary that the holes all be spaced evenly apart.

The treatment lamp, not shown, goes through the center hole 400. The fluid travels through the first plurality of holes 402 and the second plurality of holes 404. In a preferred embodiment the first plurality of holes 402 have a diameter of 4.67 mm, the second plurality of holes 404 have a diameter of 3.72 mm and the center hole has a diameter of 9.2 mm. It should be understood the diameter of all of the holes could be changed without deviating from the scope of the present invention. Additionally, it is not necessary that the holes are circular, e.g., the holes could be a variety of other shapes.

The outlet baffle 114 is designed to direct the fluid toward the middle of the treatment chamber 100 so that the fluid maintains the desired flow velocity over the entire treatment area 120.

In one embodiment, the first inlet baffle 110, the second inlet baffle 112 and the outlet baffle 114 are made from metal (e.g., stainless steel), plastic or a transmissive material (e.g., quartz glass). The present invention is not limited to the material used for the baffles. In other embodiments the first inlet baffle 110, the second inlet baffle 112 and the outlet baffle 114 are made from any one of the following or combination thereof: Fluoropolymers such as FEP (flourinated ethylene-propylene perfluoro (ethylene-propylene)), EVA (ethylene vinyl acetate), PTFE (polytetrafluoroethylene), PFA (perfluoro (alkoxy alkane)), polyvinylidene fluoride (PVDF), and ethyl vinyl alcohol, polyvinyllidine chloride (PVDC): Saran, and polyamides, such as nylon and polychlorotrifluoroethylene (PCTFE): Aclar. Advantageously, when the first inlet baffle 110, the second inlet baffle 112 and the outlet baffle 114 are transmissive baffles, there is treatment throughout the entire treatment chamber. Having treatment throught the entire chamber prevents buildup of biofilms on the first inlet baffle 110, the second inlet baffle 112 and the outlet baffle 114 or in areas of the chamber (especially the first input area 116, the second input area 118, and the output area 122) that are shielded from the light if non-transmissive baffles are used.

Figure 5:
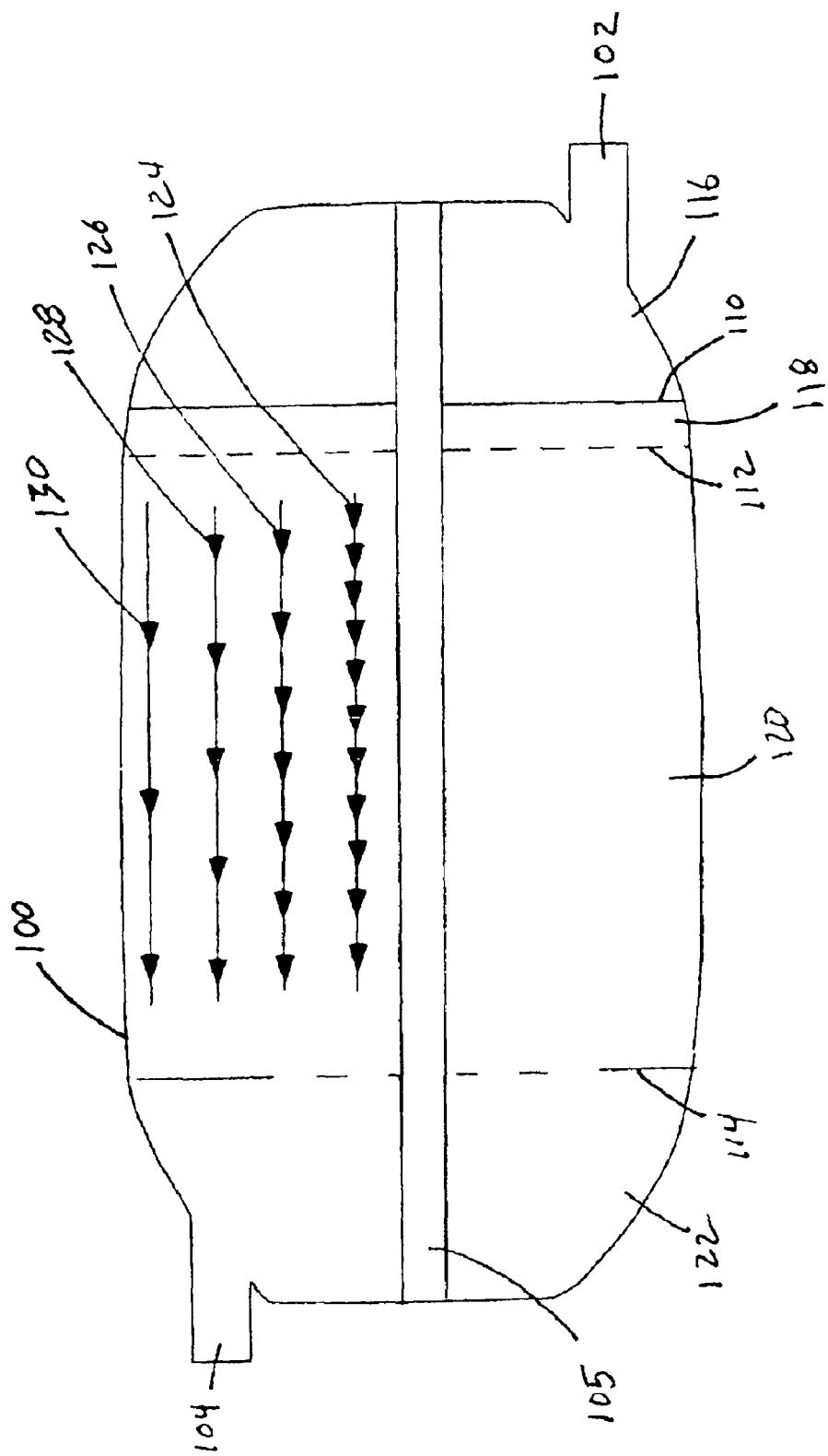
FIG. 5 illustrates top cross-sectional view of a non-uniform flow of a fluid within the treatment chamber of FIG. 1A.

Referring to FIG. 5 a top cross-sectional view is shown of a non-uniform flow of a fluid within the treatment chamber 100 shown in FIG. 1A. Shown is the treatment chamber 100, the inlet 102, the outlet 104, the treatment lamp 105, the first inlet baffle 110, the second inlet baffle 112, the outlet baffle 114, the first input area 116, the second input area 118, the treatment area 120, the output area 122, a first flow line 124, a second flow line 126, a third flow line 128 and a fourth flow line 130.

The treatment lamp 105 is located at the center of the treatment chamber 100. According to one embodiment, the treatment lamp 105 is a light source that provides pulsed polychromatic light, for example, broad spectrum pulsed light (BSPL), which illuminates and treats the fluid passing through the treatment chamber 100. BSPL is commonly produced by Xenon gas flashlamps, as known in the art. BSPL is pulsed light in the form of high-intensity, short duration pulses of incoherent polychromatic light in a broad spectrum, also referred to as broad-spectrum pulsed light (i.e. BSPL) or broadband pulsed light. For example, each portion of the fluid is illuminated by at least one, preferably at least two and most preferably at least three (e.g., 3, 5, 10, 15, 20, 30, 40 or more) consecutive short duration (e.g., less than about 100 ms, preferably about 150 $\mu$s or 300 $\mu$s) pulses of high-intensity (e.g., 0.001 J/cm$^2$ to 50 J/cm$^2$, e.g., 0.01 J/cm$^2$ to 1.0 J/cm$^2$, depending on the type of fluid being treated) incoherent polychromatic light in a broad spectrum (e.g., 170 nm to 2600 nm; i.e., $1.8 \times 10^{15}$ Hz to $1.2 \times 10^{14}$ Hz). However, such polychromatic light may comprise wavelengths within any subset of the range of 170 nm to 2600 nm (by filtering the emitted light, for example), e.g., the energy density or fluence of the pulsed light may be concentrated within wavelengths between 170 nm and 1800 nm, between 170 nm and 1000 nm, between 200 nm and 500 nm, or between 200 nm and 300 nm, for example.

Broad-spectrum pulsed light (BSPL) described through this specification as a light treatment may also be referred to generically as "pulsed polychromatic light" or even more generically as pulsed light. Pulsed polychromatic light represents pulsed light radiation over multiple wavelengths. For example, the polychromatic light, whether pulsed or continuous wave, may comprise light having wavelengths between 170 nm and 2600 nm inclusive, such as between 180 nm and 1500 nm, between 180 nm and 1100 nm, between 180 nm and 300 nm, between 200 and 300 nm, between 240 and 280 nm, or between any specific wavelength range within the range of 170–2600 nm, inclusive. The choice of materials and/or spectral filters may be used produce a desired spectral range of the illumination. As is generally known, Xenon gas flashlamps produce pulsed polychromatic light having wavelengths at least from the far ultraviolet (200–300 nm), through the near ultraviolet (300–380 nm) and visible (380 nm–780 nm), to the infrared (780–1100 nm). In one example, the pulsed polychromatic light produced by these Xenon gas flashlamps is such that approximately 25% of the energy distribution is ultraviolet (UV), approximately 45% of the energy distribution is visible, and approximately 30% of the energy distribution is infrared (IR) and beyond. It is noted that the fluence or energy density at wavelengths below 200 nm is negligible, e.g., less than 1% of the total energy density. Furthermore, these percentages of energy distribution may further be adjusted. In other words, the spectral range may be shifted (e.g., by altering the voltage across the flashlamp) so that more or less energy distribution is within a certain spectral range, such as UV, visible and IR. In some embodiments it may be preferable to have a higher energy distribution in the UV range. It is further noted that pulsed polychromatic light may be produced by light sources other than Xenon gas flashlamps.

It should be well understood that the treatment lamp 105 can be any lamp which produces light. It is noted that although many embodiments of the invention utilize the treatment lamp 105 that provides a light treatment including pulsed polychromatic light (one example of which being BSPL), other embodiments of the invention use the treatment lamp 105 that provides pulses of monochromatic light, such as a pulsed laser emitting light at a specified wavelength. Thus, when referring to a fluid treatment system that uses "pulsed light", it is meant that this pulsed light may be polychromatic or monochromatic pulsed light. It is also noted that although preferred embodiments of the invention utilize pulsed light, some embodiments utilize the treatment lamp 105 that provides continuous wave light, such as a continuous wave UV light, such as provided by Mercury gas lamps.

Thus, in general terms, the treatment lamp 105 of the fluid treatment system can comprise a light source emitting light having at least one wavelength of light within a range between 170 nm and 2600 nm. For example, a pulsed polychromatic flashlamp (broad spectrum or narrow spectrum), a pulsed UV lamp, a pulsed laser, a continuous wave lamp, a continuous wave UV lamp, etc., could all serve as a light source 154 that may be used according to different embodiments of the invention.

Furthermore, in preferred embodiments, at least 0.5% (preferably at least 1% or at least 5%) of the energy density or fluence level of the pulsed polychromatic (or monochromatic) light emitted from the treatment lamp 105 is concentrated at wavelengths within a range of 200 nm to 320 nm. The duration of the pulses of the pulsed light should be approximately from about 0.01 ms to about 100 ms, for example, about 10 $\mu$s to 300 $\mu$s.

Several apparatus designed to provide high-intensity, short duration pulsed incoherent polychromatic light in a broad-spectrum are described, for example, in U.S. Pat. No. 4,871,559 of Dunn, et al., entitled METHODS FOR PRESERVATION OF FOODSTUFFS, issued Oct. 3, 1989; U.S. Pat. No. 4,910,942 of Dunn, et al., entitled METHODS FOR ASEPTIC PACKAGING OF MEDICAL DEVICES, issued Mar. 27, 1990; U.S. Pat. No. 5,034,235 of Dunn, et al., entitled METHODS FOR PRESERVATION OF FOODSTUFFS, issued Jul. 23, 1991; U.S. Pat. No. 5,489,442 of Dunn, et al., entitled PROLONGATION OF SHELF LIFE IN PERISHABLE FOOD PRODUCTS, issued Feb. 6, 1996; U.S. Pat. No. 5,768,853 of Bushnell, et al., entitled DEACTIVATION OF MICROORGANISMS, issued Jun. 23, 1998; U.S. Pat. No. 5,786,598 of Clark, et al., entitled STERILIZATION OF PACKAGES AND THEIR CONTENTS USING HIGH-DENSITY, SHORT-DURATION PULSES OF INCOHERENT POLYCHROMATIC LIGHT IN A BROAD SPECTRUM, issued Jul. 28, 1998; and U.S. Pat. No. 5,900,211 of Dunn, et al., entitled DEACTIVATION OF ORGANISMS USING HIGH-INTENSITY PULSED POLYCHROMATIC LIGHT, issued May 4, 1999, all of which are assigned to PurePulse Technologies of San Diego, Calif. and all of which are incorporated herein by reference.

The fluence level is generally adjustable by adjusting the voltage across the treatment lamp 105, e.g., a flashlamp, however, it has been found that these adjustments affect the fluence or intensity profile of the emitted light over the given spectrum, i.e., a change in the voltage across the treatment lamp 105 non-uniformly changes the fluence across the given spectrum. Thus, in one embodiment, the voltage across the treatment lamp 105 is kept constant such that the fluence of the treatment lamp 105 is kept constant through the treatment area 120. The flow of the fluid is then matched to the fluence of the treatment lamp 105 such that every particle of the fluid receives substantially the same amount of total energy. In another embodiment, the treatment lamp 105 produces pulsed light. In this embodiment, the fluence of each pulse is kept substantially constant. The flow of the fluid is then matched to the fluence of the pulsed light such that every particle of the fluid receives substantially the same amount of total energy. Thus, the flow of the fluid is such that the slower moving particles of fluid are treated at a lower intensity of light and the faster moving particles of fluid are treated at a higher intensity of light.

The treatment lamp has a specific fluence pattern which varies depending upon certain parameters, including, the type of treatment lamp 105 being used, lamp dimensions and lamp electrical power parameters. Generally, the fluence of the treatment lamp 105 decreases as you move away from the treatment lamp 105 in a radial direction. Additionally, the fluence of the treatment lamp 105 decreases as you move axially away from the center of the treatment lamp 105. Thus, in order to establish a flow of the fluid that matches the fluence of the treatment lamp 105, the flow rate must decrease as you move farther away from the treatment lamp 105.

Shown in FIG. 5 is the first flow line 124, the second flow line 126, the third flow line 128 and the fourth flow line 130. The first flow line 124 represents the flow at the shortest distance from the treatment lamp 105, thus, the flow rate of the fluid at the first flow line 124 will be greater than the flow rate of the fluid at the second flow line 126, the third flow line 128 and the fourth flow line 130. Generally, the flow rate decreases at each flow line the farther away from the treatment lamp 105 the flow line is located. It should be understood in accordance with the present invention that the flow of the fluid at every point on the first flow line 124 will not necessarily be faster than the flow of the fluid at every point on the second flow line 126, the third flow line 128, and the fourth flow line 130, however, the average flow rate of the fluid over the entire length of the first flow line 124 will be faster than the average flow rate of the fluid over the entire length of any of the second flow line 126, the third flow line 128 and the fourth flow line 130. Thus, by making adjustments to the first inlet baffle 110, the second inlet baffle 112, and the outlet baffle 114, the flow of the fluid in the treatment area 120 can be adjusted to match the fluence of the treatment lamp 105.

By substantially matching the flow of the fluid through the treatment area 120 an efficient treatment chamber is provided. Additionally, a much more uniform treatment of the fluid is provided that reduces the chances of over treating or under treating particles of the fluid. Furthermore, a compact treatment chamber is provided that can evenly treat the fluid flowing through it while maintaining a relatively high flow rate of the fluid as compared to treating a thin film of fluid. In addition to providing a more even treatment of the fluid, the treatment chamber uses less energy as the amount of light needed to treat the fluid is less than a system that has to over treat some of the fluid in order to ensure all of the fluid receives a minimum amount of energy from the light. In one preferred embodiment the fluid flowing through the treatment chamber is water wherein every particle receives approximately 0.75 J/cm$^2$ of total energy.

The fluid is not required to match the fluence of the treatment lamp throughout the entirety of the treatment area 120. In some embodiments, the treatment area 120 can be defined as the area in which the fluid does substantially match the fluence of the light source.

In accordance with the present invention many means of matching the flow of fluid to the fluence profile of a light source are contemplated, such that all of the fluid is treated with approximately the same amount of total energy. The invention is not limited only to controlling the flow of fluid through the use of a plurality of baffles.

Figure 6:
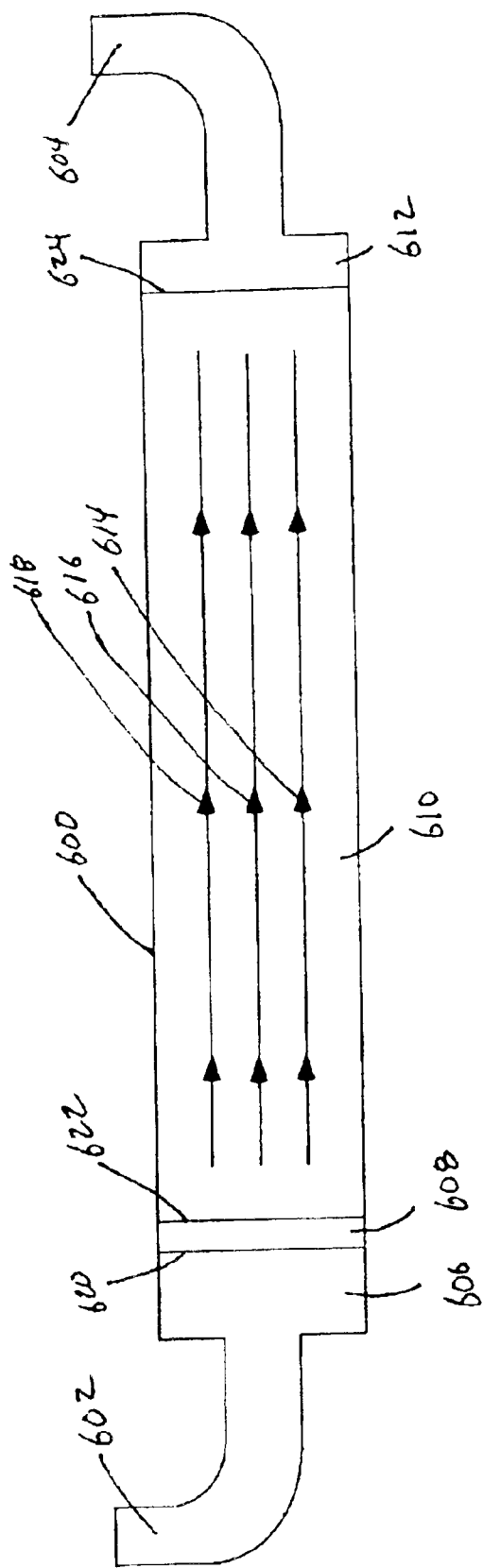
FIG. 6 illustrates a cross-sectional view of a treatment chamber in accordance with the present invention designed for the uniform flow of fluid.

Referring to FIG. 6 a cross-sectional view is shown of a treatment chamber in accordance with the present invention designed for the uniform flow of fluid. Shown is the treatment chamber 600, an entry 602, an exit 604, a first input area 606, a second input area 608, a treatment area 610, an output area 612, a first flow line 614, a second flow line 616, a third flow line 618, a first inlet baffle 620, a second inlet baffle 622, and an outlet baffle 624.

Generally, the treatment chamber 600 is light transmissive. Thus, in some embodiments, the treatment chamber 600 is made of materials such as polymers, polyolefins, fluorinated polymers, halogenated polymers, polyamides, nylons, plastics, or combinations thereof. In general, the treatment chamber 600 can be made from any suitable light transmissive material.

In this embodiment, in order to match the flow intensity of the fluid to the intensity of the treatment lamp the flow of the fluid at the first flow line 614 and the third flow line 618 is faster than the flow of the fluid at the second flow line 616. In this embodiment, the treatment lamp, such as is describe above, is external to the treatment chamber 600.

Thus, in some embodiments, at least a portion of the treatment chamber 600 is transmissive to at least 1% of light having at least one wavelength between 170 and 2600 nm. For example, the treatment chamber 600 is made of materials transmissive to at least portions of the light emitted by a light source, e.g., FEP (flourinated ethylene-propylene perfluoro (ethylene-propylene)), EVA (ethylene vinyl acetate), PTFE (polytetrafluoroethylene), PFA (perfluoro (alkoxy alkane)), ethyl vinyl alcohol, polyvinylidene fluoride (PVDF), polyvinyllidine chloride (PVDC): Saran, and polyamides, such as nylon and polychlorotrifluoroethylene (PCTFE): Aclar. It is appreciated that the treatment chamber 600 may take many forms other than those specifically described herein.

The treatment lamp (not shown) is placed outside of the treatment 600 chamber shown in FIG. 6. It should be understood that one or more treatment lamps may be utilized in accordance with the present invention. As described above, it should be well understood the treatment lamp may be any type of treatment lamp previously described herein.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A system for treating a fluid comprising:
    a treatment chamber;
    a light source for emitting light, such that at least a portion of the light travels within the treatment chamber; and
    a treatment area within the treatment chamber;
    wherein a flow profile of the fluid in the treatment area matches the fluence profile of the light that travels within the treatment area;
    wherein the light source is external to the treatment chamber.

2. The system of claim 1 wherein the light source is a broad spectrum pulsed light source.

3. The system of claim 1 wherein the light source produces at least one wavelength of light between 170 nm and 2600 nm.

4. The system of claim 1 wherein the light source is a continuous wave light source.

5. The system of claim 1 wherein the light source is a mercury gas lamp.

6. The system of claim 1 wherein the light source as a pulsed laser.

7. A system for treating a fluid comprising:
   a treatment chamber;
   a light source for emitting light, such that at least a portion of the light travels within the treatment chamber;
   a treatment area within the treatment chamber; and
   a plurality of baffles coupled to the treatment chamber, wherein the baffles control the flow of fluid within the treatment chamber;
   wherein a flow profile of the fluid in the treatment area matches the fluence profile of the light that travels within the treatment area.

8. The system of claim 7 wherein the plurality of baffles provide for substantially uniform treatment of the fluid.

9. A system for the treatment of fluid comprising:
   a treatment chamber;
   a light source for emitting light, such that at least a portion of the light travels within the treatment chamber; and
   a plurality of transmissive baffles for controlling the flow of fluid within the treatment chamber;
   wherein the transmissive baffles allow transmission of the light throughout the treatment chamber preventing biofilm buildup within the treatment chamber;
   wherein the plurality of baffles match the flow of fluid to the fluence profile of the light source in at least a portion of the treatment chamber.

10. The system of claim 9 wherein the light source is a broad spectrum pulsed light source.

11. The system of claim 9 wherein the light source produces at least one wavelength of light between 170 nm and 2600 nm.

12. The system of claim 9 wherein the light source is a continuous wave light source.

13. The system of claim 9 wherein the light source is a mercury gas lamp.

14. The system of claim 9 wherein the light source is a pulsed laser.

15. The system of claim 9 wherein the light source is internal to the treatment chamber.

16. The system of claim 9 wherein the light source is external to the treatment chamber.

17. An apparatus for treating a fluid with light comprising:
    a treatment chamber;
    a first baffle within the treatment chamber for slowing the velocity of the fluid;
    a second baffle within the treatment chamber for matching the flow of the fluid a fluence profile of light traveling within at least a portion of the treatment chamber; and
    a third baffle within the treatment chamber for maintaining the flow of the fluid throughout a treatment area.

18. The apparatus of claim 17 wherein at least a part of a light source is within the treatment chamber.

19. The apparatus of claim 17 wherein a light source is outside the treatment chamber.

20. A method of treating a fluid comprising:
    inputting the fluid into a treatment chamber;
    exposing the fluid to light from a treatment lamp;
    matching a flow profile of the fluid with a fluence pattern of a light source within at least a portion of the treatment chamber;
    outputting the fluid from the treatment chamber;
    providing a first baffle within the treatment chamber designed to slow the fluid velocity;
    providing a second baffle within the treatment chamber designed to distribute the flow of the fluid; and
    providing a third baffle within the treatment chamber designed to maintain the flow of the fluid through a treatment area.

21. A method of treating fluid comprising:
    inputting a fluid into a treatment chamber;
    matching a flow profile of the fluid with a fluence pattern of a treatment lamp; and
    outputting the fluid from the treatment chamber;
    wherein the treatment lamp is external to the treatment chamber.

22. The system of claim 21 wherein the treatment lamp produces a broad spectrum pulsed light.

23. The system of claim 21 wherein the treatment lamp produces at least one wavelength of light between 170 nm and 2600 nm.

24. The system of claim 21 wherein the treatment lamp produces a continuous wave light.

25. The system of claim 21 wherein the treatment lamp is a mercury gas lamp.

26. The system of claim 21 wherein the treatment lamp is a pulsed laser.

* * * * *